Aug. 13, 1957   R. E. DAY   2,802,708
PISTON
Filed Dec. 20, 1954
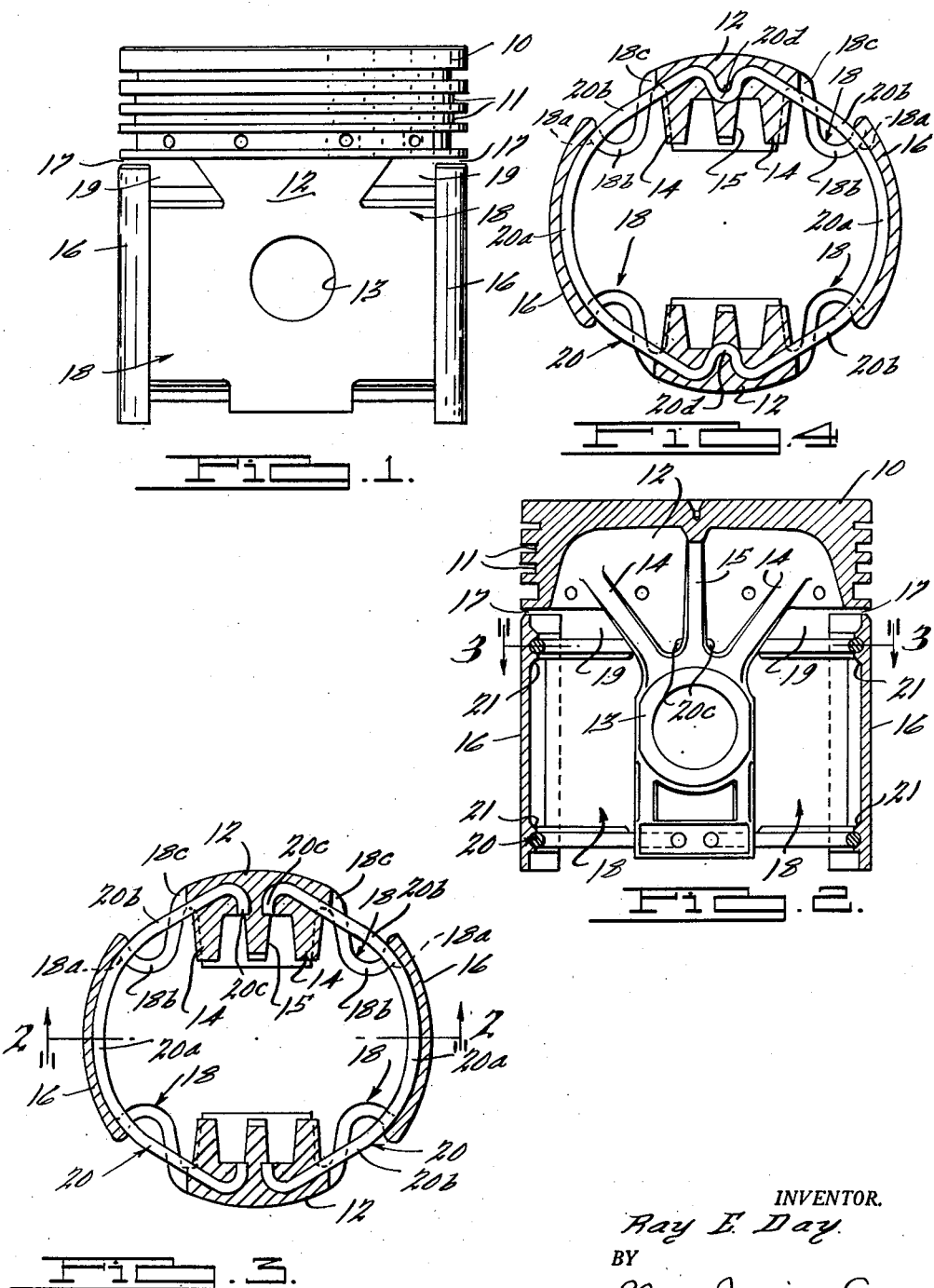
INVENTOR.
Ray E. Day.
BY
Elmer Jamison Gray
ATTORNEY.

United States Patent Office 2,802,708
Patented Aug. 13, 1957

2,802,708

PISTON

Ray E. Day, Grosse Pointe Park, Mich.

Application December 20, 1954, Serial No. 476,215

11 Claims. (Cl. 309—12)

This invention relates to pistons for internal combustion engines and particularly, although not exclusively, to pistons which may be formed from aluminum alloys.

An important object of the present invention is to provide a flexible skirt piston having skirt or slipper sections separated from the piston head and flexibly joined in improved manner to the supports for the piston pin bosses to afford substantially uniform pressure and bearing engagement throughout the skirt bearing areas, thereby to reduce skirt friction and avoid appreciable scoring throughout the bearing area of the skirt sections under all ordinary operating conditions of thermal expansion and contraction.

Heretofore, in the solution of problems encountered in connection with the use of flexible skirt pistons, efforts have been directed principally toward constructing the piston so that the skirt sections will yield sufficiently to compensate for expansion conditions and avoid seizing while at the same time rendering the skirt sections stiff enough to withstand the side thrusts imposed by the motion of the connecting rod. Various methods have been employed to deal with the problem of undue skirt friction under various operating conditions. Cam grinding the skirt to oval shape is commonly employed with the view of enabling the skirt bearing surfaces to conform progressively to the shape of the cylinder wall consequent to thermal expansion of the skirt.

I have found that optimum piston operation without undue friction at localized areas of the skirt or undesirable distortion of the skirt consequent to loads imposed thereon generally is not achieved by a compromise between skirt stiffness and flexibility, nor by cam grinding the skirt to oval shape, with the view to minimizing seizing under expansion conditions while at the same time introducing sufficient stiffness into the skirt to withstand loads imposed by connecting rod side thrust. I have found that in high speed engines the pistons are subjected to such severe rocking forces that as a result thereof problems are encountered which are as serious or more so than the problems incident to connecting rod side thrust. These rocking forces, which develop during high speed engine operation, are concentrated largely at the localities of the top and bottom of the skirt and it is important that they be compensated for without, however, undesirably affecting the flexibility factor of the piston predetermined for efficient control of side thrust forces. If however in attempting to compensate for rocking forces the skirt of the piston is made stiff enough to withstand these forces, then frequently this results in the skirt being stiffer than necessary to compensate for side thrust forces, resulting in excessive friction between the skirt and cylinder wall.

The present invention has for one of its chief purposes the provision of a flexible skirt or slipper type piston, supported from the piston pin boss supports in improved manner so as to effectively resist rocking forces directed at the top and bottom of the skirt, yet capable of withstanding side thrust forces with less skirt friction and with a minimum of skirt distortion.

In accordance with the illustrated embodiment of the invention, the skirt or slipper sections are separated from each other and from the piston head. Each skirt section is supported at opposite sides from the piston pin boss supports by means of a pair of outwardly concave cylindrical struts in the nature of spring bows which are capable of yielding to the desired degree under operating conditions. Upper and lower ferrous or steel bands having arcuate portions engageable with the inner surfaces of the skirt sections adjacent their top and bottom edges respectively are stressed to exert radially outward pressure on the skirt sections when the latter are at operating temperatures. From the lateral edges of the skirt sections the bands have portions of greater rigidity than the arcuate portions extending angularly inwardly from the circumference of the skirt sections toward the adjacent pin boss supports and are anchored therein. Accordingly, the skirt sections are held in arcuate shape and are urged radially outwardly to a larger diameter than would otherwise exist were it not for the steel bands. Since the aluminum alloy of the piston expands and contracts thermally more than do the steel bands, the cooler the piston becomes, the greater will be the radially outward stress exerted by the steel bands. When the piston becomes heated from room temperature during ordinary use and expands thermally, the skirt sections merely relax their radially inward tension on the steel bands which hold the skirt sections in expanded condition prior to their being heated. Accordingly, the diameter of the skirt sections remains substantially constant. Circumferential expansion and contraction of the skirt sections is absorbed by the resiliency of the concave struts.

The foregoing construction achieves important advantages. The prestressed steel bands adjacent the upper and lower ends of the skirt sections maintain the latter in circular shape and afford the requisite resistance to rocking forces, while the resilient spring-bow struts permit sufficient yield to prevent scoring. In consequence, friction is reduced. Also the skirt sections may be finished round and will have substantially full bearing surfaces under all conditions of operation, whether cold or hot, thereby enhancing piston life and oil control and reducing piston slap.

Other objects of this invention will appear in the following description and appended claims, reference being had to the accompanying drawings forming a part of this specification wherein like reference characters designate corresponding parts in the several views.

Fig. 1 is a side elevation of a piston embodying the present invention, looking in the direction of the axis of the piston pin bosses.

Fig. 2 is a vertical section taken substantially through lines 2—2 of Fig. 3, looking in the direction of the arrows.

Fig. 3 is a horizontal section taken substantially through lines 3—3 of Fig. 2, looking in the direction of the arrows.

Fig. 4 is a view similar to Fig. 3 illustrating a modification.

It is to be understood that the invention is not limited in its application to the details of construction and arrangement of parts illustrated in the acompanying drawings, since the invention is capable of other embodiments and of being practiced or carried out in various ways. Also it is to be understood that the phraseology or terminology employed herein is for the purpose of description and not of limitation.

In the embodiment of the invention illustrated by way of example, the piston comprises an annular head 10 provided with ring grooves 11 for the reception of the customary piston rings. Depending integrally from the head 10 at opposite sides thereof are a pair of boss supports or hanger members 12 carrying pin bosses or bearings 13. Each depending boss support 12 is reinforced or stiffened by means of an outer pair of downwardly converging ribs 14 and a central vertical rib 15. These ribs are integral with the head 10 and boss supports 12 and, as illustrated in Fig. 2, extend at their upper ends into the head 10 and terminate at their lower ends substantially at the bosses 13.

The piston skirt in the embodiment of the invention comprises a pair of arcuate skirt sections or thrust bearing slipper members 16 having coaxial inner and outer circular cylindrical surfaces. Each skirt section 16 is separated from the head by means of a slot 17, thereby providing a construction in which the skirt sections are arranged at opposite sides of the bosses 13 in separated relation to each other and to the head 10 and are supported from the depending boss supports 12.

The supporting means for each skirt or slipper section 16 comprises a pair of spring-bow struts 18 spacing the skirt circumferentially from the boss supports 12. The two struts 18 associated with each skirt section 16 originate integrally with the latter's opposite lateral edges, converge inwardly toward each other at 18a, then curve away from each other and toward the adjacent boss supports 12 in outwardly concave cylindrical loops 18b which terminate in reversely curved portions 18c joined integrally with the lateral outer edge portions of the adjacent boss supports 12.

Cooperable with the struts 18 in maintaining the circularly cylindrical contour of the skirt sections 16 are a pair of steel bands or tensioning rods 20 adjacent the upper and lower edges of the skirts. Each band 20 has a circular central portion 20a seated in a sector channel 21 extending circumferentially within an inner thickening of the associated skirt section 16. From the opposite edges of the skirt section 16, each band 20 slants radially inwardly at straight chord portions 20b toward the adjacent supports 12. Each chord portion 20b crosses the opening of the adjacent loop 18b, enters the adjacent support 12, and terminates in a generally radially inbent end portion 20c anchored within the support 12.

In fabrication of the assembly, the steel bands 20 are preferably placed within the cavity of a permanent mold prior to casting the aluminum alloy. Thereafter the molten aluminum alloy is poured into the mold to form the head 10, supports 12, skirt sections 16, and struts 18 as an integral structure having the steel bands 20 embedded therein as illustrated. When the aluminum alloy solidifies and cools, it shrinks a greater amount than do the steel bands 20 and exerts substantial tension inwardly on the latter, thereby to maintain the circular shape of the skirts 16. Thus the bands assume the thrust load on the piston and control its expansion. For example, if the bands were to be cut, the piston would collapse substantially. Inasmuch as the skirts 16 are prevented by the bands 20 from shrinking to the contour they would otherwise assume at room temperature if it were not for the bands 20, the extent of thermal expansion of the skirts as they become heated during normal operation is minimized.

The curved struts 18 connecting the supports 12 and skirts 16 serve as springs which absorb the contraction and expansion of the piston elements and hold the skirt sections 16 tightly against the bands 20 under all operating conditions. By virtue of the construction shown, in particular the shape of the bands 20 and interacting portions of the piston, it has been found that the thrust forces are centered on the skirt bearing area in such a way that the skirt sections 16 remain circular and present a substantially full circular bearing area at all times, regardless of the temperature of the piston. Accordingly the latter is feasibly finished circularly, rather than cam ground, achieving the full bearing area at all times during operation.

Although the bands 20 illustrated in the present instance are of circular section, they may be of square or rectangular section. For some piston sizes, the bands 20 are preferably formed by partially flattening steel wire of circular section, thereby to achieve a flattened wire with rounded edges. Also in the present instance, a broad strut 18 is employed between the upper and lower bands 20. For a particularly long piston, a strut below the lowermost band is employed. However, since the bands 20 must take both the thrust and rocking load on the piston, it is usually desirable to locate the bands 20 as closely as feasible to the upper and lower edges of the skirt sections 16. On extremely long pistons, as for example for some types of diesel engines, more than two bands 20 spaced axially of the piston are employed to sustain the load thereon.

In Fig. 4 there is illustrated a modification in which a single steel band, split at one side, is utilized in place of the two bands illustrated in Fig. 3. In such instance the separated ends of the band are anchored to one of the bosses in the same manner as shown in Fig. 3. The continuous central portion of the band is provided with a bent or offset lug portion 20d anchored in the other boss, such lug or anchoring portion being utilized in Fig. 4 in lieu of the bent end portions 20c of the embodiment of Fig. 3. In some instances a continuous steel band may be used in place of the two bands of Fig. 3 or the single split band of Fig. 4. A single continuous band in such case may be anchored to the bosses by means of two bent lug portions 20c.

It will be noted that by virtue of the chord or strut portions 20b of each steel band the arcuate skirt engaging portions 20a of the band are held substantially rigidly against rocking and side thrust forces to which the piston is subjected. These chord or strut portions of the steel band or bands are preferably substantially flat or straight over the major length thereof, or at least are formed with less curvature than the arcuate portions 20a, or are substantially flattened with respect to the arcuate portions so as to have greater rigidity than the latter. As a result of this construction optimum control of the skirt diameter is achieved.

I claim:

1. A piston comprising a head, a pair of opposite boss carrying supports depending from the head, a pair of opposed skirt sections separated from each other and from said head, strut means supporting the skirt sections from the boss supports at each side thereof including a pair of resilient struts joined at one edge to an edge of a skirt section and joined at its opposite edge to the adjacent boss support at a locality adjacent the outer periphery of the piston, and means for holding each skirt section radially outwardly comprising a steel band having an arcuate section conforming to the contour of the skirt section and slidably engaging the same under pressure yieldingly urging the skirt section radially outwardly, said band also having connector sections of greater rigidity than the arcuate section joining the latter to the bosses.

2. A piston comprising a head, a pair of opposite boss carrying supports depending from the head, a pair of opposed skirt sections separated from each other and from said head, strut means supporting the skirt sections from the boss supports at each side thereof including a pair of resilient struts joined at one edge to an edge of a skirt section and joined at its opposite edge to the adjacent boss support, and means for holding each skirt section radially outwardly comprising a steel band having an arcuate section conforming to the contour of the skirt section and slidably engaging the same under pressure yieldingly urging the skirt section radially outwardly, said band also having connector sections of greater rigidity than the arcuate section joining the latter to the bosses, each connector section extending substantially tangentially from one of each of the ends of the arcuate section toward and into the adjacent boss and having an inbent portion within the boss anchoring the connector section and boss against relative sliding movement.

3. A piston comprising a head, a pair of opposite boss carrying supports depending from the head, a pair of opposed skirt sections separated from each other and from said head, strut means supporting the skirt sections from the boss supports at each side thereof including a pair of resilient struts joined at one edge to an edge of a skirt section and joined at its opposite edge to the adjacent boss support at a locality adjacent the outer periphery of the piston, and means for holding each skirt section radially outwardly comprising a steel band having an arcuate section conforming to the contour of the skirt section and slidably engaging the same under pressure yieldingly urging the skirt section radially outwardly, said arcuate section extending at least to the outer circumferential edges of the skirt section, said band also having connector sections of greater rigidity than the arcuate section joining the latter to the bosses.

4. A piston comprising a head, a pair of opposite boss carrying supports depending from the head, a pair of opposed skirt sections separated from each other and from said head, strut means supporting the skirt sections from the boss supports at each side thereof including a pair of resilient struts joined at one edge to an edge of a skirt section and joined at its opposite edge to the adjacent boss support, and means for holding each skirt section radially outwardly comprising a steel band having an arcuate section conforming to the contour of the skirt section and slidably engaging the same under pressure yieldingly urging the skirt section radially outwardly, said band also having straight connector sections extending substantially tangentially from the opposite ends of the arcuate section toward and into the adjacent boss and being anchored within the latter against relative sliding movement.

5. A piston comprising a head, a pair of opposite boss carrying supports depending from the head, a pair of opposed skirt sections separated from each other and from said head, strut means supporting the skirt sections from the boss supports at each side thereof including a pair of resilient struts, each being bowed inwardly and joined at its opposite edges to the adjacent edges of the skirt section and boss support at locations adjacent the outer periphery of the piston, and means for holding each skirt section radially outwardly comprising a steel band having an arcuate section engageable with the skirt section and connector sections of greater rigidity than the arcuate section joining the latter to the bosses.

6. A piston comprising a head, a pair of opposite boss carrying supports depending from the head, a pair of opposed skirt sections separated from each other and from said head, strut means supporting the skirt sections from the boss supports at each side thereof including a pair of resilient struts, each being bowed inwardly and joined at its opposite edges to the adjacent edges of the skirt section and boss support at locations adjacent the outer periphery of the piston, and means for holding each skirt section radially outwardly comprising a steel band having an arcuate section engaging the skirt section and under tension yieldingly urging the latter radially outwardly and also having straight connector sections extending from opposite edges of the arcuate section and into the adjacent boss at a location adjacent the outer periphery of said piston.

7. A piston comprising a head, a pair of opposite boss carrying supports depending from the head, a pair of opposed skirt sections separated from each other and from said head, strut means supporting the skirt sections from the boss supports at each side thereof including a pair of resilient struts, each being bowed inwardly and joined at its opposite edges to the adjacent edges of the skirt section and boss support at locations adjacent the outer periphery of the piston, and means for holding each skirt section radially outwardly comprising a steel band having an arcuate section conforming to the contour of the skirt section and slidably engaging the same under pressure yieldingly urging the skirt section radially outwardly, said band also having connector sections of greater rigidity than the arcuate section joining the latter to the bosses.

8. A piston comprising a head, a pair of opposite boss carrying supports depending from the head, a pair of opposed skirt sections separated from each other and from said head, strut means supporting the skirt sections from the boss supports at each side thereof including a pair of resilient struts, each being bowed inwardly and joined at its opposite edges to the adjacent edges of the skirt section and boss support at locations adjacent the outer periphery of the piston, and means for holding each skirt section radially outwardly comprising a steel band having an arcuate section conforming to the contour of the skirt section and slidably engaging the same under pressure yieldingly during the skirt section radially outwardly, said band also having connector sections of greater rigidity than the arcuate section joining the latter to the bosses, each connecter section extending substantially tangentially from one of each of the ends of the arcuate section toward and into the adjacent boss and having an inbent portion within the boss anchoring the connector section and boss against relative sliding movement.

9. A piston comprising a head, a pair of opposite boss carrying supports depending from the head, a pair of opposed skirt sections separated from each other and from said head, strut means supporting the skirt sections from the boss supports at each side thereof including a pair of resilient struts, each being bowed inwardly and joined at its opposite edges to the adjacent edges of the skirt section and boss support at locations adjacent the outer periphery of the piston, and means for holding each skirt section radially outwardly comprising a steel band having an arcuate section conforming to the contour of the skirt section and slidably engaging the same under pressure yieldingly urging the skirt section radially outwardly, said band also having straight connector sections extending substantially tangentially from the opposite ends of the arcuate section toward and into the adjacent boss and being anchored therein adjacent the outer periphery of the piston against relative sliding movement.

10. A piston as set forth in claim 9 wherein said band is prestressed under tension at a temperature greater than the operating temperature of the piston and the coefficient of thermal expansion of the band is less than that of the skirt section, struts and boss supports.

11. A piston of aluminum alloy comprising a head, a pair of opposite boss supports depending integrally from said head, a pair of circular skirt sections separated from each other and from said head, a pair of resilient struts integrally joining said boss supports and skirt members, each strut being bowed inwardly and joined at its opposite edges to the adjacent edges of the skirt section and boss support at locations adjacent the outer periphery of the piston, and means for holding each skirt section radially outwardly comprising a steel band anchored in said boss supports adjacent the outer periphery of said piston and having an intermediate portion under stress pressing radially outwardly on the skirt section, the intermediate portion being coaxial with the skirt section and being connected adjacent the latter's opposite edges with the portions of said band anchored in said boss supports by straight chord portions extending angularly inwardly with respect to the surface of the skirt section, said chord portions having greater rigidity than said intermediate portion.

References Cited in the file of this patent

UNITED STATES PATENTS

| | | |
|---|---|---|
| 1,600,558 | Morrow | Sept. 21, 1926 |
| 1,891,419 | Jardine | Dec. 20, 1932 |
| 2,139,271 | Jardine | Dec. 6, 1938 |
| 2,705,667 | Fahlman et al. | Apr. 5, 1955 |

FOREIGN PATENTS

| | | |
|---|---|---|
| 407,478 | Great Britain | Mar. 22, 1934 |